US011423466B2

(12) United States Patent
Hill et al.

(10) Patent No.: US 11,423,466 B2
(45) Date of Patent: Aug. 23, 2022

(54) SHOPPING CART PREVIEW SYSTEMS AND METHODS (71) Applicant: Amazon Technologies, Inc., Seattle, WA (US)

(72) Inventors: Woody Talofa Hill, Brisbane (AU); Adrian Parry, Jimboomba (AU); Fodi Dervidis, Hemmant (AU); Raymond Smith, Kelvin Grove (AU); Courtney Elizabeth Sowter, Taringa (AU); Tony Hon Kit Li, Brisbane (AU); Marvin Tas, Brisbane (AU); Haziq Nordin, Brisbane (AU); Casey Goodge, Encinitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 16/902,037

(22) Filed: Jun. 15, 2020

(65) Prior Publication Data
US 2021/0390614 A1 Dec. 16, 2021

(51) Int. Cl.
*G06Q 30/00* (2012.01)
*G06Q 30/06* (2012.01)
*G06Q 10/08* (2012.01)

(52) U.S. Cl.
CPC ..... *G06Q 30/0635* (2013.01); *G06Q 10/0875* (2013.01); *G06Q 30/0639* (2013.01); *G06Q 30/0641* (2013.01)

(58) Field of Classification Search
CPC ..... G06Q 30/0601–0645; G06Q 30/08; G06Q 10/0875

(Continued)

(56) References Cited

U.S. PATENT DOCUMENTS 10,088,331 B1\* 10/2018 Yeh ............... G01C 21/206
2010/0312672 A1\* 12/2010 Leila ............. G06Q 30/0643
705/27.1

(Continued)

OTHER PUBLICATIONS

O'Brien, Sara, The grocery shopping app for the 99%, Sep. 6, 2016, cnn.com, accessed at [https://money.cnn.com/2016/09/06/technology/basket-shopping-app/] (Year: 2016).\*

(Continued)

*Primary Examiner* — Jeffrey A. Smith
*Assistant Examiner* — Lindsey B Smith
(74) *Attorney, Agent, or Firm* — Kilpatrick Townsend & Stockton LLP (57) ABSTRACT Described herein is a system and techniques for implementing a single mechanism that, when activated, provides multiple shopping cart previews for different resource providers generated based on a list of items which is customized according to the user that activated the mechanism. In some embodiments, a list of item types may be received by the system from the user including item types. The system may identify a number of potential items for each of the item types in the list of item types available at each resource provider. The user may then be provided with a shopping cart preview with the list of items from each resource provider. In some embodiments, the user may be provided with the ability to complete a transaction for one or more of the shopping cart previews.

17 Claims, 7 Drawing Sheets

(58) Field of Classification Search
USPC .............................................. 705/26.1–27.2
See application file for complete search history.

(56) References Cited

U.S. PATENT DOCUMENTS

| | | | | |
|---|---|---|---|---|
| 2012/0303479 | A1* | 11/2012 | Derks | G06Q 30/00 |
| | | | | 705/26.8 |
| 2012/0316989 | A1* | 12/2012 | Wong | G06Q 30/0601 |
| | | | | 705/26.9 |
| 2014/0067564 | A1* | 3/2014 | Yuan | G06Q 30/0641 |
| | | | | 705/16 |
| 2015/0120482 | A1* | 4/2015 | Kourpas | G06Q 30/0619 |
| | | | | 705/26.2 |
| 2015/0220979 | A1* | 8/2015 | Ouimet | G06Q 30/0633 |
| | | | | 705/14.49 |

OTHER PUBLICATIONS

WO Application No. PCT/US2021/036750, International Search Report and Written Opinion, dated Sep. 28, 2021, 11 pages.

* cited by examiner

SHOPPING CART PREVIEW SYSTEMS AND METHODS

Consumers want the ability to shop and pickup items at a store in an efficient manner. For example, a customer may want to minimize the amount of time spent at a store, or minimize the number of stores that the customer has to visit to complete a shopping trip.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and techniques by which a user may view multiple shopping cart previews, each generated from an item list, each shopping cart preview representing items matching the list and present at one of multiple retail locations. In some embodiments, the item list is a list of item types generated by the user that, when provided to a retailer, is processed in accordance with information related to the item types and/or the user that generated the item list. In some embodiments, one or more user preferences may be stored in association with a user account. The user preferences indicate item preferences, item restrictions, shopping history, or any other suitable item selection criteria that may be used to select an item within a particular item type. Upon receiving the list of item types from the user, the system retrieves one or more user preferences associated with that user (e.g., stored within an account associated with the user) and selects appropriate items based on the item types in the list. The system performs the selection in multiple storefronts, either physical or online, and simultaneously presents the user, for each of the multiple storefronts, a virtual cart preview for the storefront indicating a particular item at the storefront for each item type in the item list. The particular items can, according to embodiments, be selected based upon the user preferences.

By way of illustration, consider a scenario in which the system is implemented by a retailer with multiple physical retail locations and an electronic interface accessible over the internet. In this scenario, a user may generate a shopping list of item types. Each of the item types is selected by using keywords known and familiar to the user, and may not be specific to any particular brand. After the user has generated a shopping list, the user may select certain preferences, such as whether to present alternatives for items on the list or to present premium or budget options. The user may then select a button to build shopping cart previews that provide previews of items from the multiple physical retail locations. The system receives the item list input by the user and determines a corresponding particular inventory item from each physical retail location for each of the item types, as available. The selections are based on availability in the inventory of each location as well as the user preferences, for example to select previously purchased items, or to select according to user-set preferences, such as premium or budget options or to select a healthy option. The system presents a single view to the user displaying the shopping cart previews from each of the physical retail locations to allow the user to review item selections. The item selections include product information including a description and a price for each item. The user can then further adjust the items within each shopping cart preview based on further additional preferences, or make substitutions as desired for particular items, such as by changing dairy milk for a non-dairy milk option or to select a preferred brand. The user can then select one or more shopping cart previews to build a shopping cart for the respective one or more selected physical retail locations, and complete a purchase of the shopping cart through the system. The user may then pickup the ordered items from the retail location(s), or can have the items delivered from the one or more physical retail locations.

Figure 1:
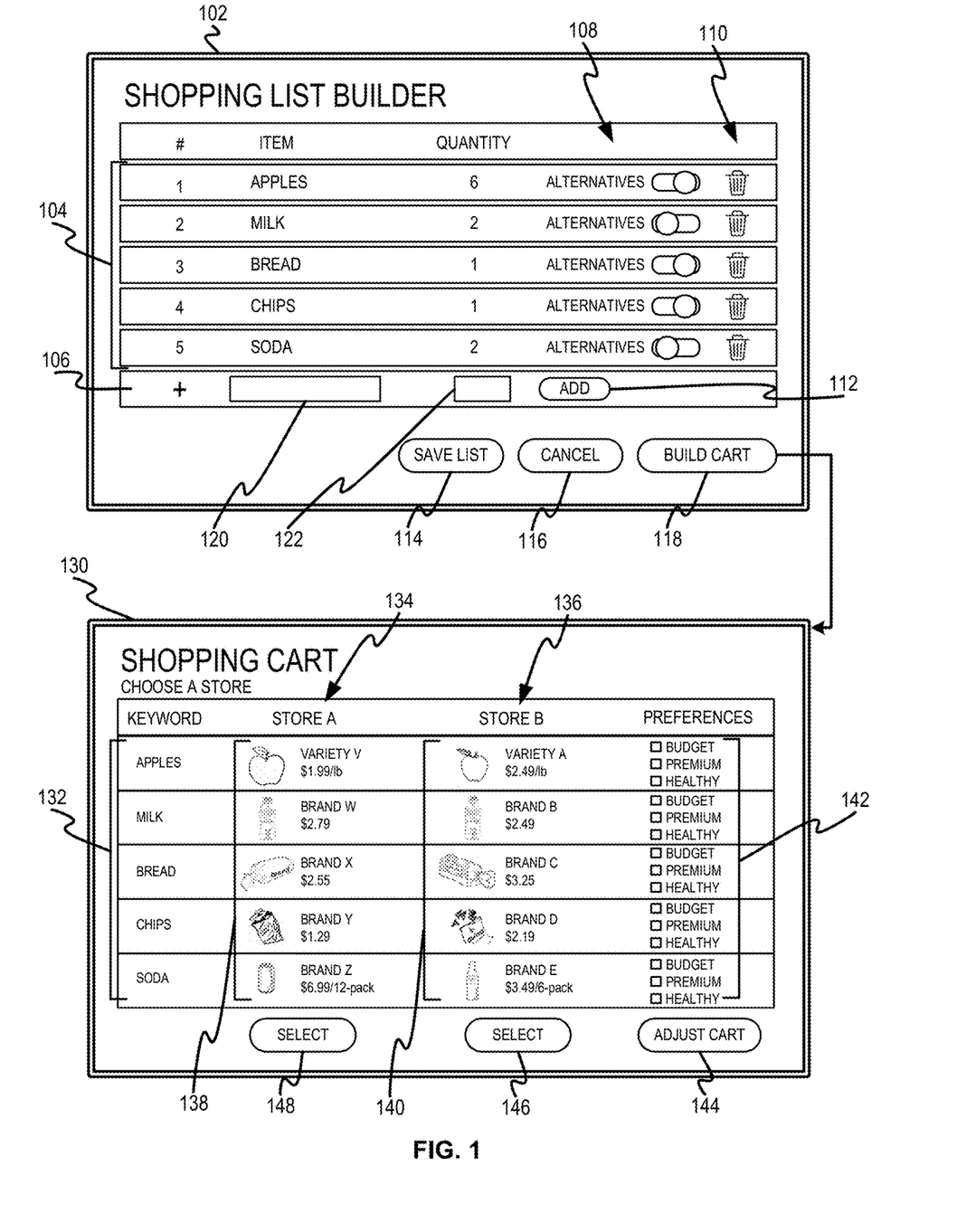
FIG. 1 depicts an example interaction that may occur in accordance with at least some embodiments described herein.

FIG. 1 depicts an example of an interaction that may occur using at least some embodiments of the system described herein. In FIG. 1, the interaction is illustrated by means of information displayed by a graphical user interface (GUI) 102 at different points in time. In particular, FIG. 1 depicts information displayed upon a GUI 102 of a web browser. In some embodiments, the GUI 102 may be generated and presented by an entity, including any computing device configured to host a webpage including the GUI 102.

In some embodiments, a user provides an item list 104 that includes item types and quantities of the various item types into a shopping list builder of GUI 102. The shopping list builder receives item type inputs 120 as well as item type quantities 122 that are used to build the item list. The item type may be input into a textbox, selected from a dropdown list, or otherwise received from any known input method. The shopping list builder of GUI 102 may build a single shopping list or multiple shopping lists from a single or from multiple item lists at the same time. For example, a user may select to have a shopping list build from a regular weekly shopping list in addition to an entertaining shopping list. The item type may include keywords that are associated with a group or sub-group of products offered by a resource provider, such as a retailer, grocery store, online marketplace, service provider, or other such provider of goods and services.

In some embodiments, the resource provider, including first retail location 134 and second retail location 136 may be an electronic retailer that maintains a digital catalog of items available for purchase, including purchasing online for shipment to a customer, or purchasing online for pickup at physical retail locations. The resource provider may maintain a number of user accounts, each of which is associated with a user of the electronic retailer. In some embodiments, upon receiving a list of item types (and potentially quantities) from the user device, the resource provider may identify a number of appropriate items corresponding to each of the item types, filter those items by availability (e.g., based on geographic location) and quantity, further filter those items based on preferences stored in or otherwise associated with the user accounts, and may select a most appropriate item for each item type. In some examples, the preferences may be applied to an entire shopping cart preview, for example by applying a brand preference, budget preference, or other such preference to all items in the cart rather than for each item individually.

The item type may include descriptions, features, or any other information that may be useful for identifying a particular category of items from a retailer. It should be noted that the item types may be indicated with any degree of specificity. For example, one or more item types may be indicated with a high degree of specificity (e.g., particular brands, versions, etc.) or with a low degree of specificity (e.g., a general category of item). An example of a low-specificity item type may be "butter," whereas a highly specific item type may be "ABC brand unsalted butter." It should be noted that any item type may be indicated with any level of specificity/breadth. For example, an item type may be indicated as being "unsalted butter," which is more specific than an item type of butter, but less specific than an item type of ABC brand unsalted butter. Additionally, user preferences may be implemented to refine item types, for example if a user has previously included "butter" on an item list 104 and has selected ABC brand unsalted butter, then ABC brand unsalted butter may be selected to fulfill the item type when available to provide a consistent purchase experience to the user.

Upon inputting the item type into item type input 120 and quantity into item type quantities 122, the user selects an add feature 112 that causes the shopping list builder to generate a new entry within item list 104. The shopping list builder also includes options that may be useful for identifying particular items. An alternative button 108 and a deletion button 110 may be used to manage entries on the item list, for example by searching for alternative items that match a particular item type or removing the item type from item list 104. The alternative button 108 may be selectable in cases where a user has selected a particular item, for example from a catalog, drop down list, or specific identifier of the retailer. In some examples, GUI 102 may include options for additional user preferences, such as price preferences, organic selections, brand specific preferences such as brand-name or generic store-brand options, and the like.

When the user has completed building item list 104, the user may click a build cart button 118 which initiates the system in generating the shopping cart previews shown in a second GUI 130. The shopping cart previews of second GUI 130 show item list 132 as well as first items 138 and second items 140 corresponding to each of the item types from respective retail locations 134 and 136. First retail location 134 and second retail location 136 may include physical retail locations such as grocery stores and may also include online retailers, for example with grocery delivery available. In some examples, the shopping cart previews of GUI 130 may show multiple different selections of items from the same physical retail location, for example a first list for premium items from the physical retail location and a second list for budget items from the same physical retail location. First retail location 134 and second retail location 136 may be selected for presentation in second GUI 130 based on the user's location, previous use by the user, location in proximity to the user, or user selection or preference. Though grocery items are depicted, it is intended that any items that would be available for purchase may be accessed and viewed using the shopping cart previews. First items 138 include inventory items available at first retail location 134 as well as prices for each item on item list 132. Second items 140 include inventory items available at the second retail location 136 as well as prices for each item on item list 132. In the example that is shown in the drawing, the first items 138 and the second items 140 can include different brands or items within a single item type, such as "Brand W" milk versus "Brand B" milk. Each is within the item type of "Milk" as identified in item list 132, but Brand W may not be available at both locations. For each, the system chooses the best matching item for the item type that has been selected by the user, utilizing the user preferences, previous shopping history, and other information described herein. If, alternatively, both retail locations had the same milk, e.g., Brand W, the same milk may be shown for that item type on both shopping carts. Some items may not be available at one of the retail locations, or item types unavailable at a particular retail location, in which case second GUI 130 may indicate that the given item is unavailable.

The user may select additional preferences 142 to further refine the item selections for one or more of the item types at each retail location. For example, the preferences 142 for an item type may include budget items, premium items, healthy items, organic items, or other such sub-categories of goods from the retail locations. If desired, these preferences may be available for selection for each of the items. After adjusting one or more preferences 142, the user can select an adjust cart button 144 which will cause first items 138 and second items 140 to be updated according to the global preferences 142, for example by replacing items with premium items.

In embodiments, the user can select a shopping cart preview for one of the retail locations to fill a shopping cart through which the user can then complete the user's purchase. In alternate examples, the user may select a portion of multiple shopping cart previews (e.g., some of first items 138 and a portion of second items 140) to fill a shopping cart and complete a purchase that will be fulfilled at both first retail location 134 and second retail location 136. In an illustrative example, a user may select nonperishable items and dry goods at first retail location 134 and opt to purchase perishable items or frozen and refrigerated items at second retail location 136.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications policy. In at least some embodiments, each component of the depicted architecture may represent one or more special purpose devices configured to perform the described functions. In some embodiments, each component of the depicted architecture may comprise a cluster or group of devices that each perform the same, or a similar, function.

Figure 2:
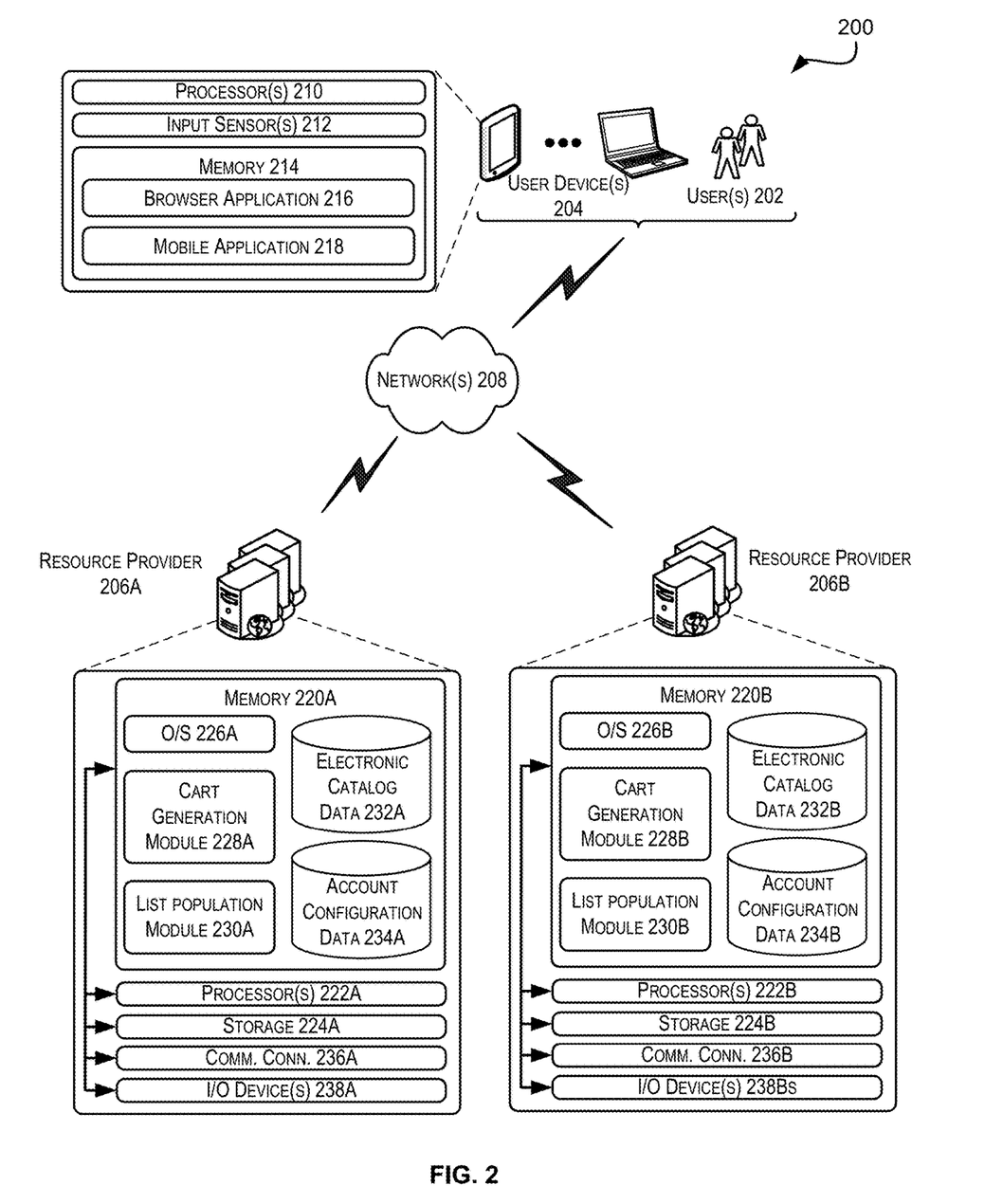
FIG. 2 depicts an illustrative example of a system or architecture in which techniques for generating shopping cart previews for multiple resource providers based on an item list.

FIG. 2 depicts an illustrative example of a system or architecture 200 in which techniques for presenting a shopping cart preview based on a list of items may be implemented. In architecture 200, one or more consumers and/or users 202 may utilize user devices 204. In some examples, the user devices 204 may be in communication with one or more resource providers 206A and 206B (collectively resource provider 206) via the network(s) 208, or via other network connections. In FIG. 2, two resource providers are shown, resource provider 206A and resource provider 206B with corresponding components that may be similar or identical and identified by a reference numeral appended with "A" or 'B" based on which resource provider 206 is referenced.

User devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. In some embodiments, the memory 214 may also include a mobile application 218 that is capable of presenting information related to an item list as well as a shopping cart preview based on the item list to a user. Although architecture 200 depicts a mobile application 218 as being included in the contents of the memory 214 of the user device 204, at least a portion of the functionality described as being performed by the mobile application 218 may be performed by an entity external to the user device 204 (e.g., resource provider 206).

In some embodiments, the mobile application 218 may be configured to provide access to, edit, and generate an item list that may be used to generate shopping cart previews associated with the resource providers 206. In an example, the user may use the mobile application 218 to generate or edit a list of item types. The mobile application 218 may be configured to convey the list of item types to the resource providers 206 and receive a list of items that correspond to each of the item types in the list to provide multiple shopping cart previews, with a shopping cart preview for each resource provider 206. The user 202 may then be presented with an option to complete a transaction to obtain at least a portion of the presented items at one of the resource providers 206. It should be noted that some embodiments of the disclosure may not include a mobile application 218. For example, a user may access a webpage using a browser application 216 and may be able to generate or edit the list of items and view the shopping cart previews received from the resource providers 206 within that browser application 216.

In some examples, the network(s) 208 may include any one or a combination of many different types of networks, such as cable networks, the Internet, wireless networks, cellular networks, and other private and/or public networks.

While the illustrated example represents the users 202 accessing the resource providers 206 via browser application 216 over the network(s) 208, the described techniques may equally apply in instances where the users 202 interact with a resource provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a resource provider 206 and/or third-party websites, such as to generate, edits, and use item lists as well as to store, access, and/or manage data, develop and/or deploy computer applications, and/or interact with web content. The one or more resource providers 206, perhaps arranged in a cluster of servers or as a server farm, may be configured to host a website (or combination of websites) viewable via the user device 204 or accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a web site, such as social networking sites, electronic retailers, informational sites, blog sites, search engine sites, news and entertainment sites, and so forth. As discussed above, the described techniques can similarly be implemented outside of the browser application 216, such as with other applications running on the user device 204 (e.g., mobile application 218).

Each resource provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the resource provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, each resource provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of resource provider 206, the memory 220 may be volatile (such as random access memory (RAM)) and/or non-volatile (such as read-only memory (ROM), flash memory, etc.). The resource provider 206 may also include additional storage 224, such as either removable storage or non-removable storage including, but not limited to, magnetic storage, optical disks, and/or tape storage. The disk drives and associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module generating shopping cart previews based on a list of item types (cart generation module 228) as well as a module for populating a customized list of items (list population module 230). The memory 220 may also include electronic catalog data 232, which provides information for a number of different items, as well as account configuration data 234, which provides information related to user preferences or other account-specific details. In some embodiments, the electronic catalog data 232 and/or the account configuration data 234 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the resource provider 206. The resource provider 206 may also contain communications connection(s) 236 that allow the resource provider 206 to communicate with a stored database, another computing device or server, user terminals, and/or other devices on the network(s) 208. The resource provider 206 may also include input/output (I/O) device(s) and/or ports 238, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing electronic catalog data 232 and/or a database containing account configuration data 234 and the one or more application programs or services for implementing the features disclosed herein, including a cart generation module 228 and/or a list population module 230.

In some embodiments, the cart generation module 228 may be configured to, in conjunction with the processors 222, receive a list of one or more items or item types and generate a shopping cart preview for one or more resource providers 206 that indicates the one or more item types available at the one or more resource providers 206. The shopping cart preview generated by the cart generation module 228 may be one that causes the resource provider 206 to, upon its receipt, generate a temporary cart preview based on a customized list of items available at the resource provider 206 that correspond to item types included in the item list. In some embodiments, the cart generation module 228 may generate a single shopping cart preview for a single resource provider 206 or may generate multiple shopping cart previews for the single resource provider 206. In some embodiments, the cart generation module 228 may generate multiple shopping cart previews for multiple resource provider 206. In some embodiments, the cart generation module 228 may generate a link to include a resource provider domain followed by information on item types and quantities. The item types and quantities may be provided to the cart generation module 228 by a user through an item list, such as a shopping list. For example, a user wishing to implement the functionality described herein may access an online marketplace maintained by a resource provider 206. The user may provide a list of item types and quantities to the resource provider 206 via the website. The resource provider 206, in response to receiving the list of item types and quantities, may generate a shopping cart preview for multiple physical retail locations operated by the resource provider 206 that includes the information using the cart generation module 228. Once generated, the user may click a button on the website to add items to a shopping cart and proceed to complete a transaction.

In some embodiments, the list population module 230 may be configured to, in conjunction with the processors 222, identify appropriate items which correspond to the item types received from the item list input, edited, or generated by the user. In some embodiments, the list population module 230 may receive a link, or a portion of a link, generated by the cart generation module 228. In some embodiments, the list population module 230 may receive a link, or a dataset identifying the item types in the item list generated by the user. The list population module 230 may parse the item list to identify each of the item types in the list of item types as well as appropriate quantities for each. To do this, the list population module 230 may filter a number of items that fall within an indicated item type. For example, the list population module 230 may receive an indication of a user's geographic location (e.g., via an internet protocol (IP) address used to access the service provider website) and may filter out any items which are not available in that user's geographic region. Additionally, items may be filtered out if the items include too little or too many of an item with respect to an indicated quantity. Once this initial filter has been performed, the list population module 230 may further filter a list of potential items that correspond to a particular item type based on configuration settings associated with an account. For example, the list population module 230 may identify user preferences or restrictions that dictate which items from a list of potential items are appropriate. Once the list of appropriate items has been generated for a particular item type, the list population module 230 may select a most appropriate item based on some weighted category. For example, the list population module 230 may select the least expensive item or the highest rated item. A most appropriate item may refer to any item which, given the resource provider's knowledge of the user, the resource provider 206 determines that the user is most likely interested in out of the items available. The process above may be repeated by the list population module 230 for each of the item types in the list of item types in order to generate a list of items corresponding to that list of item types for compilation and presentation by the cart generation module 228. The list population module 230 may then be configured to provide, in conjunction with the cart generation module 228, the list of items to the user device 204 from which the item list was received. For example, the list of items may be presented on a website operated by the resource provider 206, which may be viewed using the user device 204.

Figure 3:
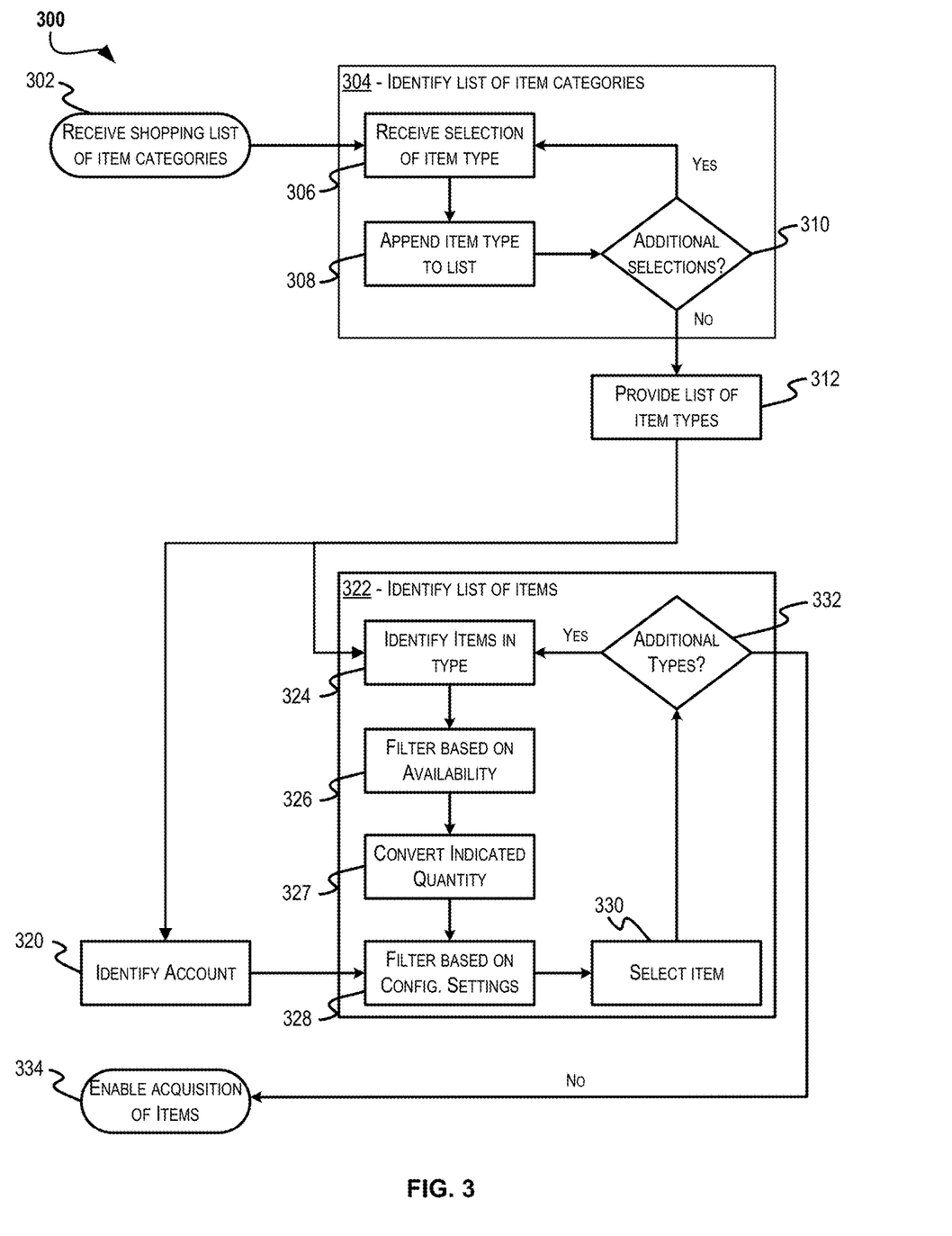
FIG. 3 depicts an illustrative flow chart demonstrating an example process for generating shopping cart previews for multiple resource providers based on an item list.

FIG. 3 depicts an illustrative flow chart demonstrating an example process for generating shopping cart previews based on item lists in accordance with at least some embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by at least the one or more resource providers 206 shown in FIG. 2. The code may be stored on a computer-readable storage medium, for example, in the form of a computer program including a plurality of instructions executable by one or more processors. The computer-readable storage medium may be non-transitory.

Process 300 may begin at 302, when a user 202 inputs a list of item types. In some embodiments, the input may be from the user device 204 and may be manually input by the user 202. In some embodiments, the list of item types may be received from a storage device such as memory 214 where a pre-created list of items may be stored and requested by the user 202.

In some embodiments, a list of item types may be generated via a subprocess 304. In subprocess 304, the user may select a number of item types to be provided in a list at 306, which may include receiving the item types from 302. The user may input item keywords that correspond to the item types. In some embodiments, the user may select specific items (e.g., products) from an electronic catalog and the service provider may translate those specific items into item types. In some embodiments, the user may select or input any string of alphanumeric symbols that identify an item or an item category, such as a code from a catalog. In some embodiments, the user may select types of items (e.g., from a drop down menu). In some embodiments, the user may also select or provide one or more attributes of information to be associated with the item type. For example, the user may select a particular amount or quantity to be associated with the item type. In this example, the user may select 1 pound of sugar. In some embodiments, the selection of information associated with an item type may be made separately from the selection of the item type (e.g., via separate drop-down menus).

In some embodiments, each item type and quantity may be appended to the list at 308 as it is selected by the user. In these embodiments, subprocess 304 may be repeated for each additional item selection as it is made at 310. In some embodiments, all of the selected item types may be added to the list at once upon selection of a mechanism to generate a list of item types.

Once a list of item types has been generated using the subprocess 304, that list may be used to generate a shopping list containing the item types at 312.

In some embodiments, the process may involve identifying an account associated with the user that generated the list of items at 320. For example, the resource provider may maintain an account associated with the user. Further to this example, the user device from which the item list was generated may contain an internet cookie that indicates a login or other identifier for the user that has been placed on the user device by the resource provider. In this example, the resource provider may automatically log the user into his or her account or at least identify the user based on the internet cookie. In some embodiments, the resource provider may request that the user log into an account maintained by the resource provider by providing login credentials.

Upon receiving the item list, the resource provider may identify a list of items available at the resource provider by invoking subprocess 322. In subprocess 322, the resource provider may parse the item list to identify the various items and quantities. For each of the identified item types, the resource provider may identify a number of potential items that fit within that item type at 324. The potential items may then be filtered based on a number of criteria. In some embodiments, the potential items may first be filtered based on geographic availability or quantity at 326. For example, the resource provider may receive an indication of a geographic location or region from which a user has accessed a link (e.g., an IP address). In this example, the resource provider may remove potential items from the list of items which are unavailable in the geographic region of the user.

In some embodiments, the list of potential items may also be filtered based on the indicated quantity. This may involve converting an amount of the item indicated as being needed in the item list into some standard, or commonly used, metric at 327. For example, if flour is typically stored in units of ounces, then an indication of 2 cups of flour may be converted into 8.5 ounces of flour. It should be noted that different item types, and even different items within an item type, may be associated with different conversion rates. For example, 1 pound of all-purpose flour may convert to 3⅓ cups, whereas 1 pound of cake flour may convert to 4½ cups. In some embodiments, a conversion rate between various types of metrics may be maintained with respect to a particular item. In some embodiments, a default conversion rate may be maintained with respect to an item type. In these embodiments, the system may first attempt to convert the metric units in accordance with a conversion rate for the particular item, and if a conversion rate for the particular item is unavailable, then the system may use the default conversion rate for the item type. In some embodiments, the system may filter out items that include that less than or more than some predetermined threshold quantity. For example, if the quantity of an item type is indicated as being 4 cups, items which include less than 2 cups (e.g., less than 50% of the indicated quantity) may be filtered out of the list of potential items.

In some embodiments, the list of potential items may be further filtered based on configuration settings. In some embodiments, an account may be associated with one or more configuration settings that indicate which items are most appropriate for one or more item types. In some embodiments, the configuration settings may indicate one or more items that must be filtered out. For example, a user may provide a configuration setting that indicates an allergy or aversion to a particular item or type of item, or a preference for a particular brand or type of item associated with the item type. In this example, items that conform to that configuration setting (including the indicated allergen or preference) may be filtered from a list of potential items and/or replaced with substitute items. For example, if the service provider is an electronic retailer that provides food products, the service provider may maintain, with respect to each item, a list of ingredients in that item. In this example, if a user indicates that he or she is allergic to peanuts, then the service provider may filter out any items that include peanuts or peanut oil as an ingredient. In some embodiments, the user may provide a configuration setting which indicates items or types of items which are acceptable. For example, the user may provide an indication of a particular diet so that any items not within that diet may be filtered out of the list of potential items. In some embodiments, the user may provide a configuration setting that includes a preference for a certain type of food product, such as organic selections. Items that do not fit the configuration setting of organic may then be filtered out.

Once a list of potential items for a particular item type has been filtered based on the configuration settings, a most appropriate item may be selected from that list of potential items at 330. In some embodiments, the configuration settings may include user preferences that are used to identify a specific item from the list of potential items. For example, the user may have previously indicated a preference for ACME brand items. In this example, the service provider may select the ACME brand version of the item type when it is available.

In some embodiments, each item in a list of potential items may be weighted based on attributes associated with that potential item. For example, the user may indicate a preference toward "organic" items, such that the service provider may assign a higher weight to organic items when selecting an appropriate item of the potential items to be presented. In some embodiments, the user may indicate one or more factors that should be given greater weight during this selection process. For example, the user may indicate that selection of the item to be presented from the list of potential items should be made based first on price, and then on item rating. In this example, the lowest priced item will be selected from the potential items, unless there is a tie, in which case the highest rated of the lowest priced items will be selected.

Subprocess 322 may be repeated for each item type identified from the link at 332 to identify a most-appropriate item for each of the item types in the list of item types. Once the completed list of items has been generated, that list may then be presented to the user that generated the item list. In some embodiments, the resource provider may enable acquisition of one or more of the items at 334. For example, the resource provider may enable the user to place one or more of the items into an electronic shopping cart, from which a purchase transaction may be completed.

The process 300 may be performed simultaneously by multiple resource providers or a single resource provider maintaining multiple physical locations where inventory may differ. For example, a chain of grocery stores may be accessible as a single resource provider while different locations of the grocery chain may each be searched or accessed independently to provide multiple options for the user.

Figure 4:
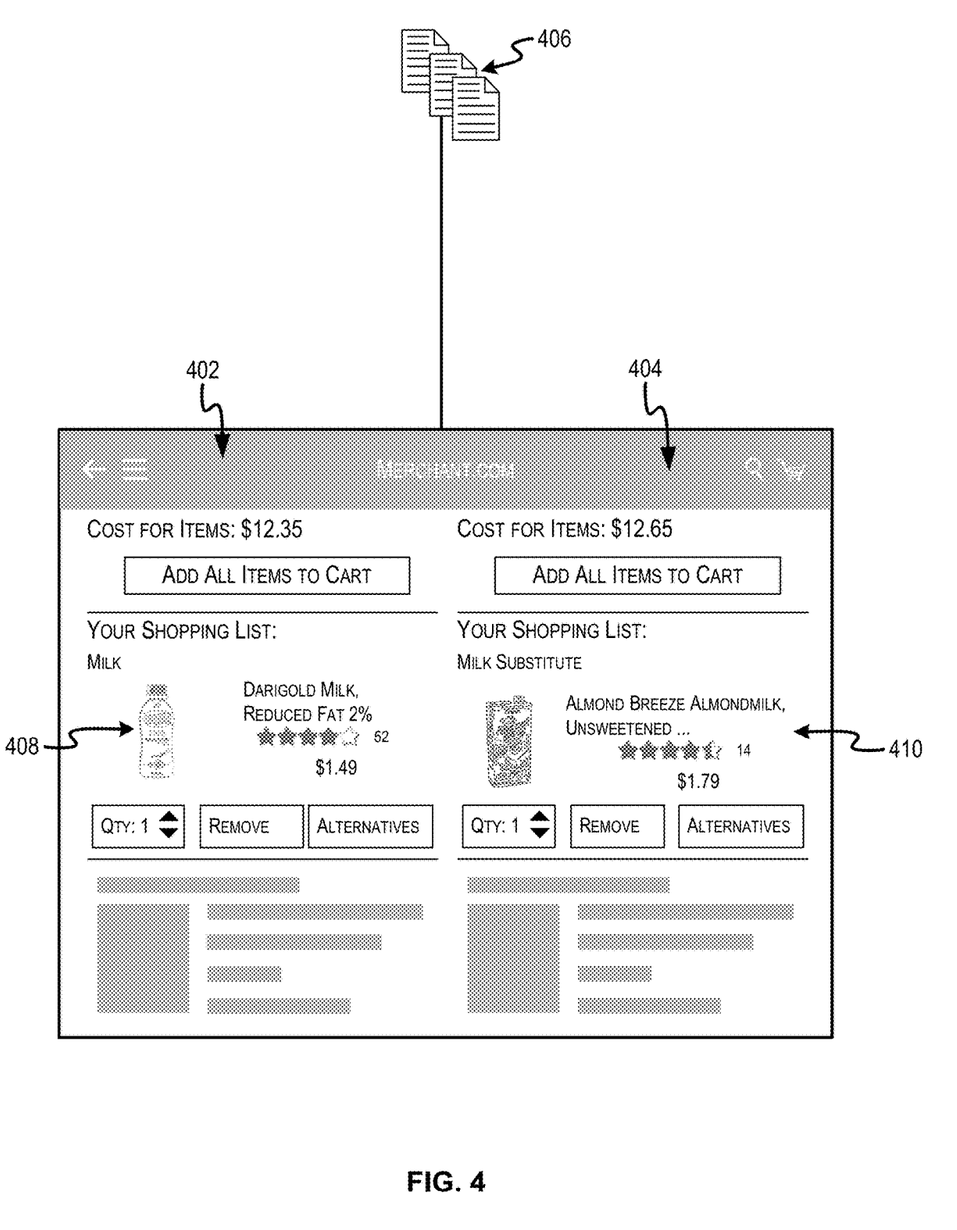
FIG. 4 depicts an illustrative example of a process by which item types may provide substitutions based on user preferences.

FIG. 4 depicts an illustrative example of a process by which one or more items in a list of items may be selected or substituted using configuration settings in order to customize the list of items in accordance with at least some embodiments. In FIG. 4, an example screenshot is used to represent alternative outcomes of an item selection process.

In some embodiments, a list of item types may be provided to the resource provider with respect to two different users. As will become apparent, different items may be presented with respect to the provided list of item types based on which user is presented to. For example, a first option 402 may depict a different set of items than a second option 404 by virtue of being associated with a different user. It should be noted that although the description references two different users, each of the options 402 and 404 may pertain to the same user. For example, the first option 402 may depict a version of the item list that may be presented if a user is not logged into an account whereas the second option 404 may depict a version of the item list that may be presented if the user is logged into the account.

In some embodiments, the resource provider may store a number of configuration settings 406 with respect to each account that it maintains. In some non-limiting examples, the configuration settings 406 may include user preference settings, item-restrictions (e.g., dietary restrictions), item aversions (e.g., food allergies), or any other suitable criteria that may be used for item selection. In some embodiments, the resource provider may derive one or more configuration settings for an account from a purchase history for that account. For example, the service provider may determine a typical price range, rating level, version, or other item attribute that the user prefers based on his or her past purchases. In some embodiments, the resource provider may generate configuration settings based on one or more attributes of a user. For example, the resource provider may generate a configuration setting that prevents the user from being offered age-restricted items if the user is under age.

In the first option 402, the configuration settings 406 for a first user account may be applied to a first item type of the list of item types, and may result in the selection of a first item 408. In the second option 404, the configuration settings 406 for a second user account may be applied to the same first item type of the list of item types, and may result in the selection of a second item 410. In this example, the only difference that may result in presentation of the first option 402 or the second option 404 may be the configuration settings 406 associated with the respective user's account. For example, if the item type is "milk" then the user (having no restrictions on milk products) may be offered a first milk product 408. However, the user may be lactose intolerant and may have a configuration setting associated with his or her account that indicates that milk products should be replaced with lactose-free versions of those products. Hence, the user may be presented a milk substitute product for the second item 410.

Figure 5:
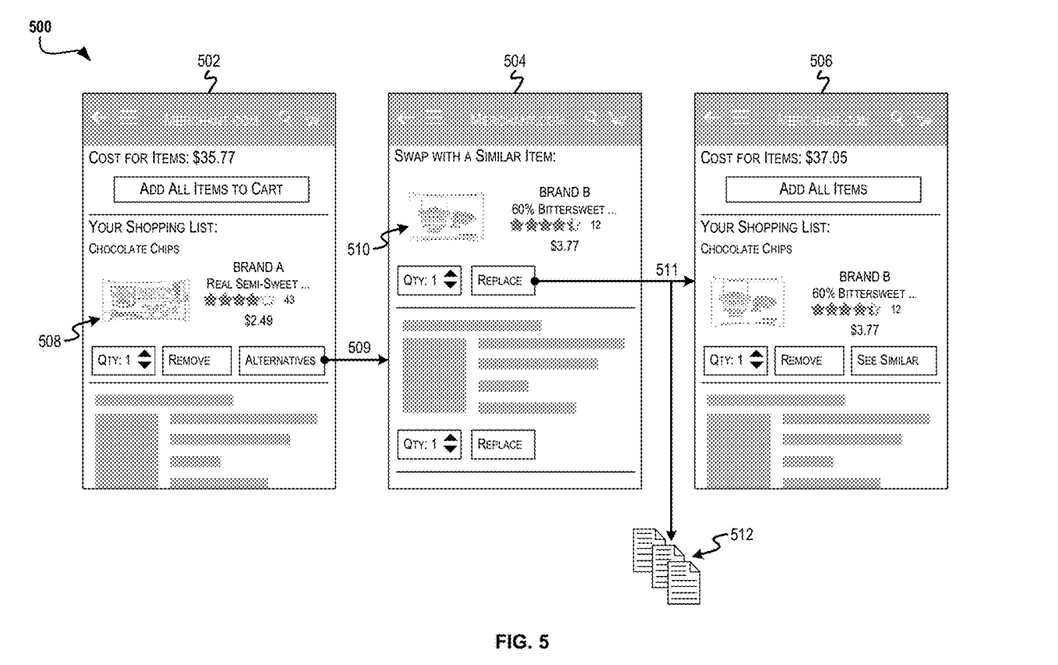
FIG. 5 depicts an illustrative example of a process by which a user may replace one or more items in a list of items.

FIG. 5 depicts an illustrative example of a process by which a user may replace one or more items in a list of items in accordance with at least some embodiments. In FIG. 5, the process 500 is depicted as a number of example screenshots used to represent various points in the process 500. In particular, the process 500 is depicted via screenshots 502, 504, and 506. In the screenshots included, a list of items for a single resource provider is shown, though in some embodiments, the screenshots may show lists of items for more than one resource provider or physical location. For each additional location or resource provider, the process 500 may be the same for each.

In some embodiments, an initial list of items may be generated using the techniques described herein (e.g., with respect to FIG. 3 above). Once the list of items has been generated and presented to a user at 502, the user may be provided with the ability to select an alternative for an item 508 from the list of items. In some embodiments, the user may select a button or other mechanism associated with the item 508 in order to initiate the replacement process.

Once the replacement process has been initiated, the user may be presented with a number of potential alternative items as depicted in screenshot 504 via arrow 509. In some embodiments, the number of potential alternative items may consist of the potential items that were not selected for the item type during the selection of a most appropriate item for a particular item type in process 300 described above. In some embodiments, the potential alternative items may be ordered based on a weighted value assigned to each potential item during the item selection process. A weighted value for an item may be calculated in any suitable manner. For example, each item may be associated with a number of attributes (e.g., price, volume, rating, etc.) which may in turn be populated with a value. Each attribute may be assigned some weight based on that attribute's importance to a particular user of, or users in general of, the system. To calculate a weighted value in this example, the service provider may multiply each attribute value (or some value determined from that attribute value) by its weight. The weighted value may be the sum of each of those products. In some embodiments, the user may be given the ability to peruse the list of potential alternative items in order to make a selection. Once the user has selected a potential alternative item 510, the user may select a button or other mechanism associated with the item 510 to indicate to the service provider that the item 508 should be replaced with the item 510. Once the service provider has received this indication, the service provider may update the list to include the replacement item 510 as depicted in screenshot 506 via arrow 511.

In some embodiments, each time that a user elects to replace an item in the list of items presented to that user, the service provider may create and store a configuration setting 512 based on that replacement. That configuration setting may be used by the service provider to apply a filter for a subsequently received list of item types. For example, upon receiving a second request for a list of items, the service provider may automatically present item 510 in lieu of item 508 if the second list would have otherwise included item 508. In some embodiments, the service provider may assign a greater weight to one or more attributes of the alternative item that was selected. For example, if the only difference between item 508 and item 510 is that item 510 is an "organic" version of item 508, then the service provider may store an indication that this user prefers organic items.

Figure 6:
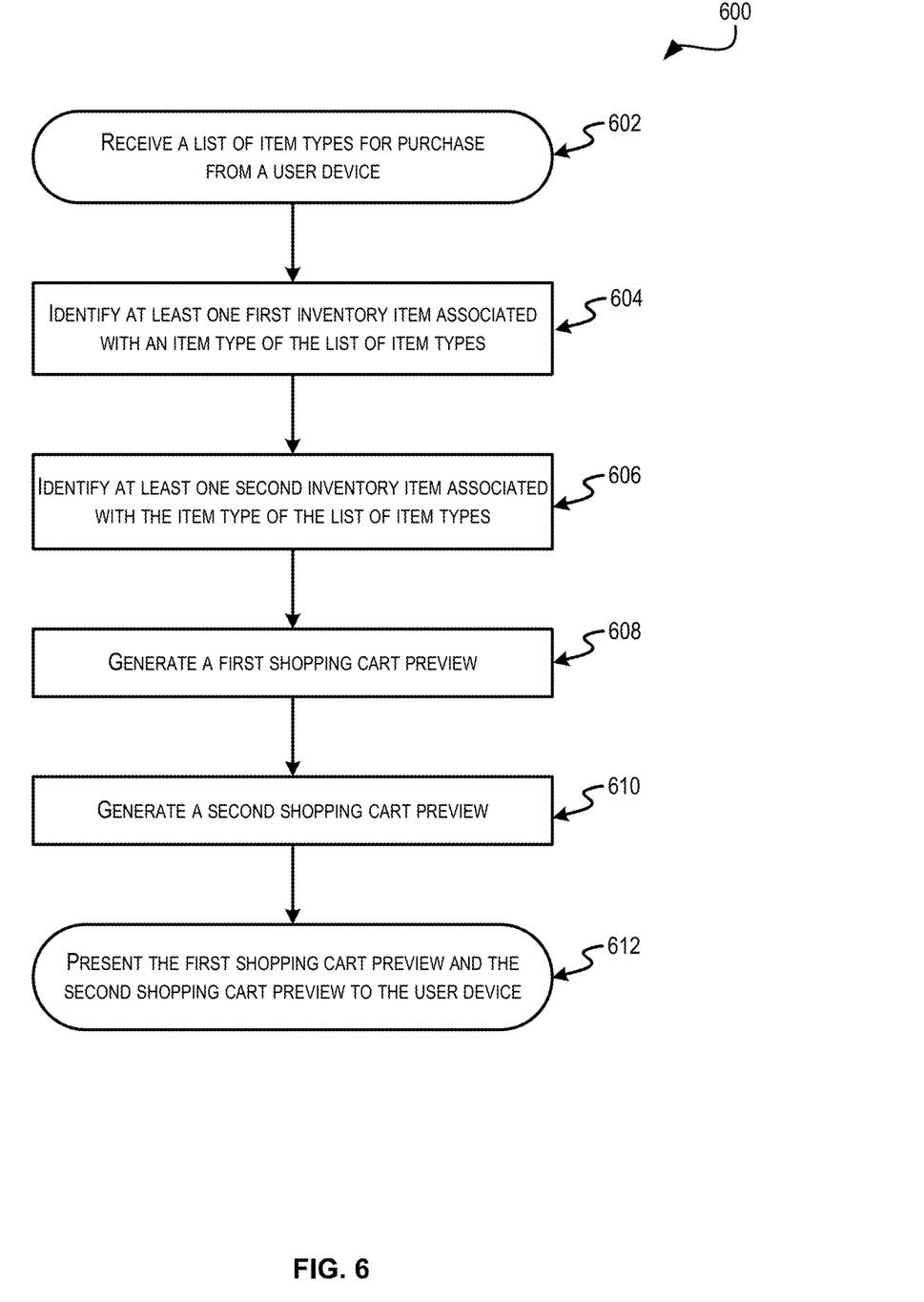
FIG. 6 depicts a flow diagram illustrating an example process for generating shopping cart previews for multiple resource providers based on an item list.

FIG. 6 depicts a flow diagram illustrating an example process for generating and presenting a list of items from a link in accordance with at least some embodiments. In accordance with at least some embodiments, the process 600 may be performed by the resource provider 206 described with respect to FIG. 2. Some or all of the process 600 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Process 600 may begin at 602, when a list of item types is received. In some embodiments, the list of item types is received from a user device. The item types may include a plurality of item types identified by simple keywords or identifiers and may also include quantities for each item type in the list of items. An indication of a geographic location may be derived from the received list of items. For example, an internet protocol (IP) address may be derived from the received request, which may be processed to identify a geographic location from which the list of items originated. The process 600 may also include identifying a user account from which the item list originated.

At 604, the process 600 may include identifying at least one first inventory item associated with an item type of the list of item types. The first inventory item may be an inventory item available for purchase, retrieval, or delivery from a first resource provider. The first resource provider may be an online retailer or a physical retailer having an online component or interface. Identifying the at least one first inventory item may include the processes or subprocesses described above with respect to FIG. 3. Some of the subprocesses may include identifying a subgroup of items available from the resource provider that may match the item type. The process may also include selecting, based on user preferences or configuration settings, a particular item from the resource provider that matches the item type. This may include querying an inventory of items and identifying items that fit the item type based on the term or terms used to identify the item type.

At 606, the process 600 may include identifying at least one second inventory item associated with the item type of the list of item types. The second inventory item may be an inventory item available for purchase, retrieval, or delivery from a second resource provider. The second resource provider may be an online retailer or a physical retailer having an online component or interface. Identifying the at least one second inventory item may include the processes or subprocesses described above with respect to FIG. 3. Some of the subprocesses may include identifying a subgroup of items available from the resource provider that may match the item type. The process may also include selecting, based on user preferences or configuration settings, a particular item from the resource provider that matches the item type. This may include querying an inventory of items and identifying items that fit the item type based on the term or terms used to identify the item type.

At 608, the process 600 may include generating a first shopping cart preview. The first shopping cart preview includes item selections for each of the item types from the item list received at 602 that are available from the first resource provider. In some embodiments, the first resource provider may not have inventory items that match each item type, in which case the first shopping cart preview may simply indicate that no item is available.

At 610, the process 600 may include generating a second shopping cart preview. The second shopping cart preview includes item selections for each of the item types from the item list received at 602 that are available from the second resource provider.

At 612, the process 600 may include presenting the first shopping cart preview and the second shopping cart preview to the user device. The first shopping cart preview and the second shopping cart preview may be selectable by the user through the user device. Additionally, the user may be given the ability to complete a transaction for one or more of the shopping cart previews based on the list of items. In some embodiments, the user may be given the ability to replace one or more items in the list of items with an alternative item. This is described in greater details with respect to FIG. 5 above. In some embodiments, if the user elects to replace an item with an alternative item, the process may further involve generating a configuration setting that indicates the user's preference for the alternative item, wherein the configuration setting may be used to filter out potential items in a second list of item types subsequently received with respect to the user account. In some embodiments, the process 600 may also include setting item configuration settings or preferences based on purchase history and substitutions or alternatives made by the user.

Figure 7:
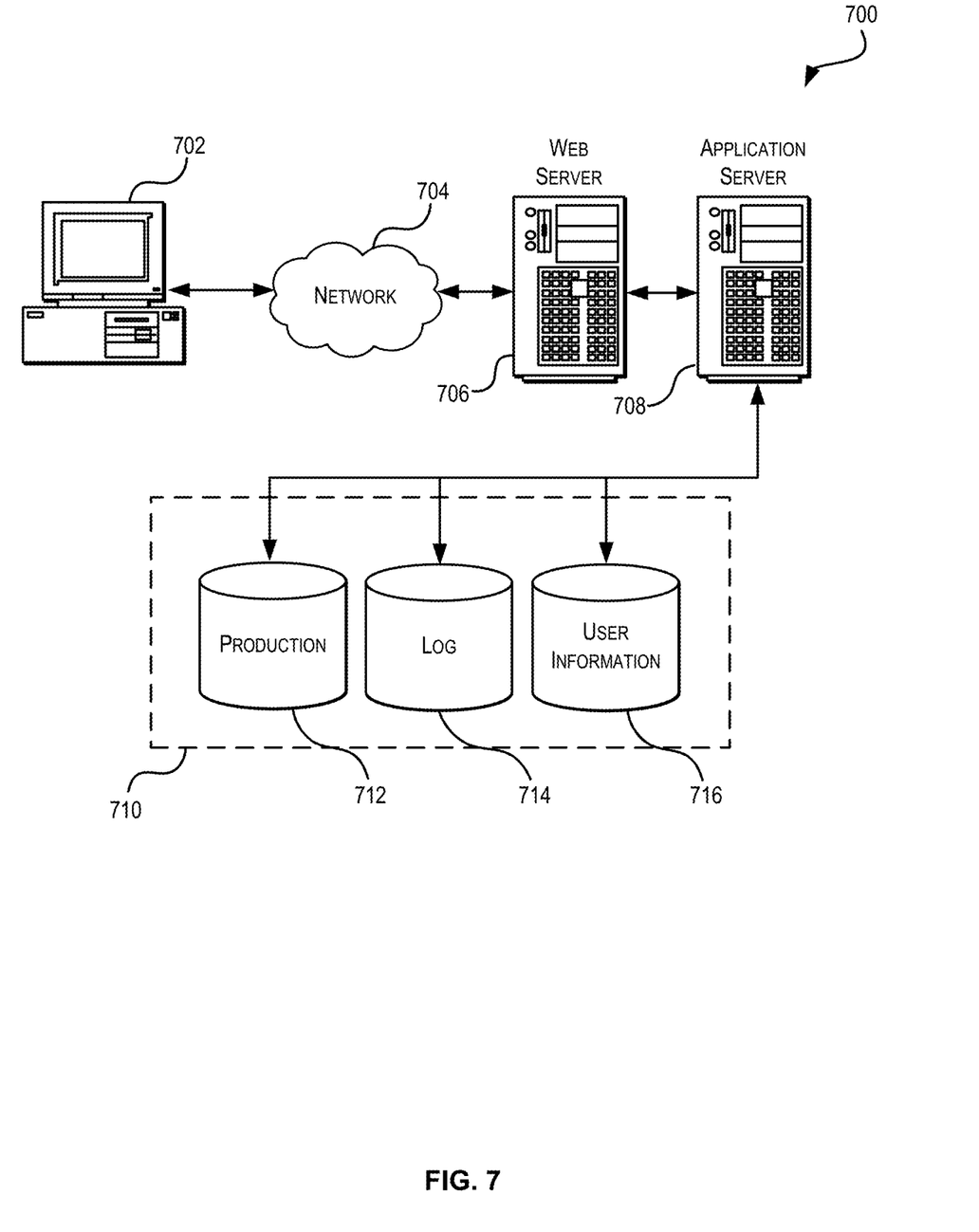
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes a user device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the example environment 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management.

These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a user device and via a user interface of the user device, a list of item types for purchase from at least one physical retail location of multiple physical retail locations;
   identifying, in response to receiving the list, from an inventory system of a first physical retail location of the multiple physical retail locations, for each item type in the list of item types, a first inventory item, the first inventory item being a first specific product of the item type;
   identifying, in response to receiving the list, from an inventory system of a second physical retail location of the multiple physical retail locations, for each item type in the list of item types, a second inventory item, the second inventory item being a second specific product of the item type;
   generating a first shopping cart preview associated with the first physical retail location and including, for each item type, the first inventory item, wherein each inventory item in the first shopping cart preview is listed in an order that is the same as the order of the received list of item types;
   generating a second shopping cart preview associated with the second physical retail location and including, for each item type, the second inventory item, wherein each inventory item in the second shopping cart preview is listed in the order that is the same as the order of the received list of item types;
   after generating the first shopping cart preview and the second shopping cart preview, automatically updating the user interface of the user device to present simultaneously the first shopping cart preview and the second shopping cart preview, wherein each shopping cart preview is displayed in its entirety in a separate and distinct area of the updated user interface;
   receiving, via the updated user interface, user selection inputs, wherein the user selection inputs comprise at least a selection of some of the first shopping cart preview and at least a selection of some of the second shopping cart preview based upon selections of at least one of the first inventory item and at least one of the second inventory item; and
   generating and displaying a final shopping cart for completing a purchase based on the user selection inputs and comprising the selected at least one first inventory item and the selected at least one second inventory item.

2. The computer-implemented method of claim 1, wherein the first inventory item and the second inventory item are selected based at least in part on a user purchase history including previous inventory items purchased by the user.

3. A computer-implemented method, comprising:
   receiving, from a user device in communication with inventory systems of a resource provider and via an associated user interface of the user device, a list of item types for purchase from the resource provider;
   identifying, in response to receiving the list, from a first inventory system of the resource provider, for each item type in the list of item types, a first inventory item associated with an item type of the list of item types, the first inventory item being a first specific product of the item type;
   identifying, in response to receiving the list, from a second inventory system of the resource provider, for each item type in the list of item types, a second inventory item associated with the item type of the list of item types, the second inventory item being a second specific product of the item type;
   generating a first shopping cart preview including, for each item type, the first inventory item, wherein each inventory item in the first shopping cart preview is listed in an order that is the same as the order of the received list of item types;
   generating a second shopping cart preview including, for each item type, the second inventory item, wherein each inventory item in the second shopping cart preview is listed in the order that is the same as the order of the received list of item types;
   after generating the first shopping cart preview and the second shopping cart preview, automatically updating the user interface of the user device to present simultaneously the first shopping cart preview and the second shopping cart preview, wherein each shopping cart preview is displayed in its entirety in a separate and distinct area of the updated user interface;
   receiving, via the updated user interface, user selection inputs, wherein the user selection inputs comprise at least a selection of some of the first shopping cart preview and at least a selection of some of the second shopping cart preview based upon selections of at least one of the first inventory item and at least one of the second inventory item; and
   generating and displaying a final shopping cart for completing a purchase based on the user selection inputs and comprising the selected at least one first inventory item and the selected at least one second inventory item.

4. The computer-implemented method of claim 3, wherein the first inventory system and the second inventory system are associated with a first physical retail location and a second physical retail location.

5. The computer-implemented method of claim 4, wherein the first physical retail location and the second physical retail location are each selected based on a geographic location of a user.

6. The computer-implemented method of claim 3, wherein the first inventory system or the second inventory system is associated with an online storefront.

7. The computer-implemented method of claim 3, wherein the first inventory item and the second inventory item are selected based on user preferences applied to the list of item types.

8. The computer-implemented method of claim 3, wherein, for each item type, the first inventory item and the second inventory item are selected based on user preferences.

9. The computer-implemented method of claim 3, wherein, for each item type, the first inventory item and the second inventory item are selected based on a user purchase history including previous inventory items purchased by the user.

10. The computer-implemented method of claim 3, further comprising:
receiving a request from the user device, for one item type in the list of item types, to substitute the first inventory item, the request including an indication of an alternative inventory item; and
replacing the first inventory item with the alternative inventory item in the first shopping cart preview.

11. A system comprising:
a processor; and
a memory including instructions that, when executed by the processor, cause the system to at least:
receive, from a user device and via a user interface of the user device, a list of item types for purchase from a resource provider;
identify, in response to receiving the list, from a first inventory system of the resource provider, for each item type in the list of item types, a first inventory item associated with an item type of the list of item types, the first inventory item being a first specific product of the item type;
identify, in response to receiving the list, from a second inventory system of the resource provider, for each item type in the list of item types, a second inventory item associated with the item type of the list of item types, the second inventory item being a second specific product of the item type;
generate a first shopping cart preview including, for each item type, the first inventory item, wherein each inventory item in the first shopping cart preview is listed in an order that is the same as the order of the received list of item types;
generate a second shopping cart preview including, for each item type, the second inventory item, wherein each inventory item in the second shopping cart preview is listed in the order that is the same as the order of the received list of item types;
after generating the first shopping cart preview and the second shopping cart preview, automatically update the user interface of the user device to present simultaneously the first shopping cart preview and the second shopping cart preview, wherein each shopping cart preview is displayed in its entirety in a separate and distinct area of the updated user interface;
receive, via the updated user interface, user selection inputs, wherein the user selection inputs comprise at least a selection of some of the first shopping cart preview and at least a selection of some of the second shopping cart preview based upon selections of at least one of the first inventory item and at least one of the second inventory item; and
generate and display a final shopping cart for completing a purchase based on the user selection inputs and comprising the selected at least one first inventory item and the selected at least one second inventory item.

12. The system of claim 11, wherein the list of item types received from the user device comprises a list identifier and the list of item types is a pre-created list accessed by the system based on the list identifier.

13. The system of claim 11, wherein the list of item types comprise plain word keywords.

14. The system of claim 11, wherein the first shopping cart preview and the second shopping cart preview comprise specific product information and prices associated with, for each item type, the first inventory item and the second inventory item.

15. The system of claim 11, wherein the first inventory item comprises multiple specific products of the item type and a specific product of the multiple specific products is selected based on user preferences.

16. The system of claim 15, wherein the specific product of the multiple specific products is selected based on a product brand or a product price.

17. The system of claim 11, wherein the first inventory item comprises multiple specific products of the item type and a specific product of the multiple specific products is selected based on a user purchase history.

* * * * *